US011675897B2

United States Patent
Regner et al.

(10) Patent No.: US 11,675,897 B2
(45) Date of Patent: Jun. 13, 2023

(54) PROCESS IDENTIFIER TRANSITION MONITORING AND ASSESSMENT

(71) Applicant: NXP USA, Inc.

(72) Inventors: Markus Regner, Munich (DE); Florian Frank Ebert, Munich (DE); Peter Seibold, Baiernrain (DE)

(73) Assignee: NXP USA, Inc., Austin, TX (US)

( * ) Notice: Subject to any disclaimer, the term of this patent is extended or adjusted under 35 U.S.C. 154(b) by 37 days.

(21) Appl. No.: 17/523,748

(22) Filed: Nov. 10, 2021

(65) Prior Publication Data

US 2022/0067145 A1 Mar. 3, 2022

Related U.S. Application Data

(63) Continuation of application No. 15/977,134, filed on May 11, 2018, now abandoned.

(51) Int. Cl.
*G06F 21/52* (2013.01)
*G06F 11/07* (2006.01)
*G06F 21/55* (2013.01)
*G06F 11/30* (2006.01)
*G06F 11/34* (2006.01)

(52) U.S. Cl.
CPC ............ *G06F 21/52* (2013.01); *G06F 11/079* (2013.01); *G06F 11/0721* (2013.01); *G06F 11/0751* (2013.01); *G06F 11/3024* (2013.01); *G06F 11/3409* (2013.01); *G06F 21/554* (2013.01); *G06F 2221/034* (2013.01)

(58) Field of Classification Search
CPC .. G06F 21/52; G06F 11/0751; G06F 11/3409; G06F 11/3024; G06F 11/079; G06F 11/0721; G06F 21/554; G06F 2221/034; G06F 2009/45587; G06F 2009/45591; H04L 63/1416; H04L 63/145; H04L 63/1466
See application file for complete search history.

(56) References Cited

U.S. PATENT DOCUMENTS

| 8,990,943 | B2 * | 3/2015 | Thomas | G06F 21/562 726/25 |
| 10,009,374 | B1 * | 6/2018 | Jing | H04L 63/1416 |
| 10,467,411 | B1 * | 11/2019 | Pidathala | G06F 21/56 |

(Continued)

OTHER PUBLICATIONS

Almohri et al.."Process Authentication for High System Assurance," IEEE Transactions on Dependable and Secure Computing Year: 2014 | vol. 11, Issue: 2 | Journal Article | Publisher: IEEE.*

(Continued)

*Primary Examiner* — Roderick Tolentino

(57) ABSTRACT

A process identifier transition monitor captures and assesses activities associated with a microprocessor or a microcontroller. Monitoring and assessment is performed by detection of process identifier transitions, which may be driven by an occurrence of one or more activities, such as execution of application software, system hardware mechanisms, or processor-internal mechanisms. Process identifier transitions are assessed to determine whether such transitions were expected. If a detected process identifier transition was not expected, then a system alert may be transmitted or some other appropriate response taken within the system.

15 Claims, 9 Drawing Sheets

(56) References Cited

U.S. PATENT DOCUMENTS

| | | | | |
|---|---|---|---|---|
| 2015/0121519 A1* | 4/2015 | Hauke | ............ | G06F 21/755 |
| | | | | 726/22 |
| 2016/0149937 A1* | 5/2016 | Katmor | ............ | H04L 63/0263 |
| | | | | 726/23 |
| 2016/0304040 A1* | 10/2016 | Narisawa | ............ | G06F 9/4831 |
| 2017/0364792 A1* | 12/2017 | Chai | ............ | G06N 3/0445 |
| 2019/0089678 A1* | 3/2019 | Lam | ............ | H04L 63/0263 |
| 2019/0156036 A1* | 5/2019 | Dabak | ............ | H04L 63/145 |
| 2019/0308589 A1* | 10/2019 | Maluf | ............ | H04L 12/2803 |

OTHER PUBLICATIONS

Muthumanickam et al., "Behavior based authentication mechanism to prevent malicious code attacks in windows," 2015 International Conference on Innovations in Information, Embedded and Communication Systems (ICIIECS) Year: 2015 | Conference Paper | Publisher: IEEE.*

* cited by examiner

|  | | PID after transition | | | | |
|---|---|---|---|---|---|---|
|  | | 0 | 1 | 2 | 3 | 4 |
| PID before transition | 0 |  | 1 | 0 | 0 | 0 |
| | 1 | 0 |  | 1 | 0 | 0 |
| | 2 | 0 | 1 |  | 1 | 0 |
| | 3 | 0 | 1 | 0 |  | 1 |
| | 4 | 1 | 1 | 1 | 0 |  |

FIG. 4

|  |  | PID after transition | | | | |
|---|---|---|---|---|---|---|
|  |  | 0 | 1 | 2 | 3 | 4 |
| PID before transition | 0 |  | NO reaction | Destructive reset reaction | Functional reset reaction | Destructive reset reaction |
|  | 1 | Destructive reset reaction |  | NO reaction | Functional reset reaction | Destructive reset reaction |
|  | 2 | Destructive reset reaction | NO reaction |  | NO reaction | Enter Safe Mode/Condition |
|  | 3 | Destructive reset reaction | NO reaction | Functional reset reaction |  | NO reaction |
|  | 4 | NO reaction | NO reaction | NO reaction | Destructive reset reaction |  |

FIG. 8

PROCESS IDENTIFIER TRANSITION MONITORING AND ASSESSMENT

CROSS-REFERENCE TO RELATED APPLICATIONS

This application is a continuation of and claims priority to U.S. patent application Ser. No. 15/977,134 entitled "PROCESS IDENTIFIER TRANSITION MONITORING AND ASSESSMENT" and filed on May 11, 2018.

TECHNICAL FIELD

The present disclosure relates in general to data processing systems, and in particular, monitoring and assessing activities occurring within a microprocessor or microcontroller.

BACKGROUND

As microcontrollers continue to be proliferated throughout more and more aspects and tools of everyday society, including home appliances, lighting, etc., and are interconnected within Internet of Things ("IOT") networks, it is important to maintain the integrity of each of these systems. Not only do consumers expect such smart devices to consistently operate as expected, but also without concern for any breaches in security. For example, as society moves ever closer to the wide-spread adoption of autonomous vehicles, the numerous microcontrollers within such vehicles will need to be virtually failsafe, or at least capable of taking action in cases of erroneous operations and cyberattacks.

Activities within a microcontroller or microprocessor operate in a predetermined order or sequence, notably, transitions from one operation, event, process, service, or thread, etc. to another. In case of some type of fault or error occurring within such activities, or in case of some sort of intentional system manipulation by a third party (e.g., a cyberattack), a deviation from such predetermined sequences can result (e.g., an erroneous transition from one activity to an unexpected activity). For example, an impact from an alpha particle may affect a system's operation, such as by causing runaway code, or a processor "babbling idiot" failure. From a security point of view, there may be a desire for a system to be notified of glitch attacks (i.e., an intentional disruption of the execution of one or more machine instructions) or operating modes that are supposed to be blocked from entry during operations of a system in the field (e.g., a test mode/condition or a boot mode). Furthermore, a deviation from a predetermined sequence may result from a failure or error in execution of application software within the microcontroller or microprocessor, such as, for example, if a serial boot mode is supposed to be entered only from a specific mode of operation, but instead is entered into from some other unexpected mode. However, not all such erroneous transitions are directly or immediately detectable by the system.

BRIEF DESCRIPTION OF THE DRAWINGS

FIG. 4 illustrates a schematic diagram of an example of a permission matrix for a system and method configured in accordance with embodiments of the present disclosure.

FIG. 8 illustrates a schematic diagram of an example of a response matrix for a system and method configured in accordance with embodiments of the present disclosure.

DETAILED DESCRIPTION

Aspects of the present disclosure utilize a process identifier transition monitor configured to determine when transitions from a first operation, event, process, thread, service, circumstance, etc. (herein collectively referred to as an "activity") to another have occurred in a microcontroller or microprocessor that may indicate an occurrence of a fault or error, an occurrence of some type of system manipulation (e.g., a cyberattack), or any unexpected activity occurring with a data processing system. In accordance with aspects of the present disclosure, the process identifier transition monitor operates independently from the microcontroller or microprocessor, since in certain scenarios or specific applications, it may be detrimental to permit software executing within the microcontroller or microprocessor to monitor whether it transitioned from one activity to another, in the expected predetermined order or sequence, because in a situation where a fault or error has occurred, or in the case of a cyberattack, the software may already be compromised, or the microcontroller or microprocessor running the software may be defective.

Figure 1:
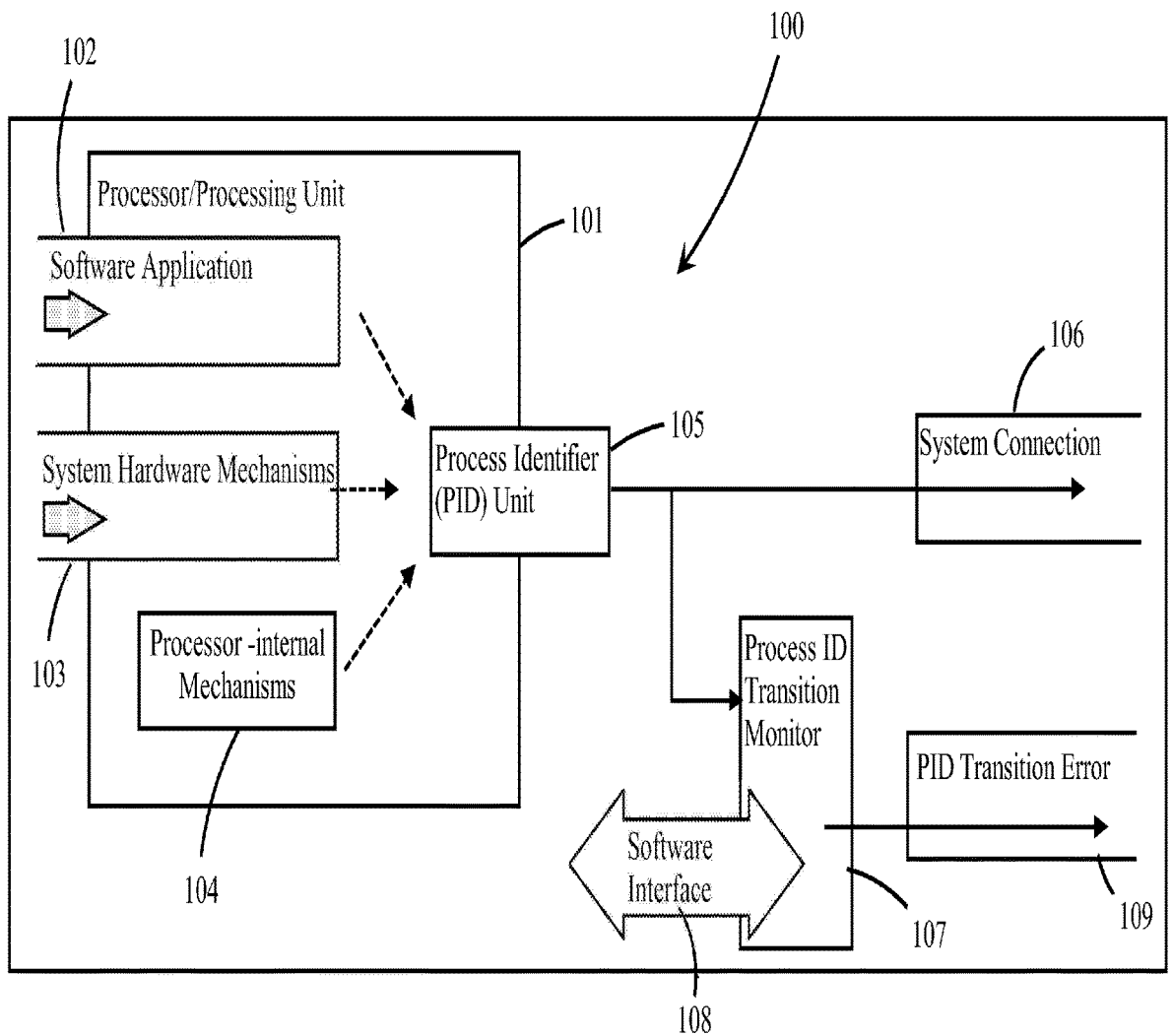
FIG. 1 illustrates a block diagram of a data processing system configured in accordance with embodiments of the present disclosure.

Referring to FIG. 1, there is illustrated a block diagram of relative portions of a data processing system 100 configured in accordance with embodiments of the present disclosure. Embodiments of the present disclosure may be implemented within any type of data processing system that utilizes a processing unit (e.g., a microprocessor or microcontroller) to perform various operations within the data processing system 100. For the sake of simplicity, such a processing unit may simply be referred to herein as the processor 101. In accordance with certain embodiments of the present disclosure, results of operations performed by the processor 101 may be output from the system 100 via a system connection 106.

The data processing system 100 may include various other components not shown, but which are well-known by those of ordinary skill in the art to be operably coupled to a processor for performing various functions particular to a specified application of the data processing system 100. Non-limiting examples of such components are further described herein with respect to FIG. 7. Though only one processor 101 is illustrated in FIG. 1, embodiments of the present disclosure are applicable to data processing systems that implement more than one such processing unit.

Embodiments of the present disclosure utilize a process identifier (also referred to herein as a "process ID" or "PID"), which can be modified by various activities occurring within the system 100. A process identifier is a number or other symbol (generally referred to herein as a "value") used within an operating system kernel to uniquely identify a particular activity occurring within or affecting a processing device or unit (e.g., a microprocessor or microcontroller).

Modification of a value of the process identifier can result from an occurrence of one or more activities, including, but not limited to, the execution of particular software code (e.g., various threads) of a software application 102 (e.g., as associated with an application program) running within the processor 101, events or mechanisms 104 occurring internally within the processor 101 that set the processor identifier to values specific to each of these events or mechanisms, and/or the setting of the process identifier to specific values pertaining to various system operations or hardware mechanisms 103 operating independently of the processor 101.

Tracking of the process identifier values may be implemented within a software or hardware unit 105 implemented within the processor 101, which will hereinafter be simply referred to as the PID unit 105. Embodiments of the present disclosure may utilize an existing PID unit implemented within the data processing system 100, or may utilize a PID unit specially created within the system 100 for the purposes described herein. Generally, the PID unit 105 can hold one value at a time for the process identifier, though embodiments of the present disclosure may be implemented with a PID unit 105 configured to store a plurality of process identifiers maintained in parallel.

Figure 2:
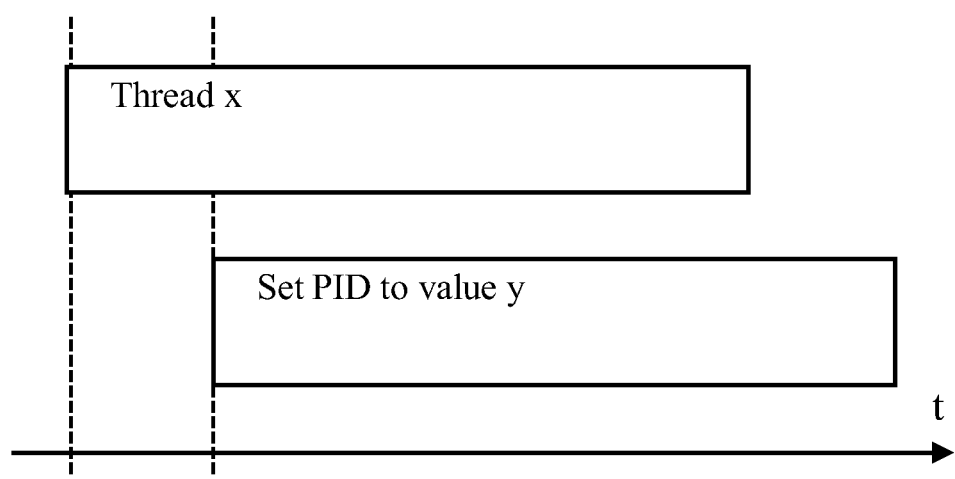
FIG. 2 illustrates a schematic diagram of an exemplary software thread to process identifier ("PID") assertion.

As previously stated, the PID unit 105 may be configured to utilize a changing (transitioning) value of the process identifier to track the execution of one or more software applications within the processor 101. For example, a software application may be separated into threads, contexts, or any other defined amount of software code, whereas the execution of each of these may affect the value of the process identifier maintained within the PID unit 105. FIG. 2 illustrates an example of how such a software application thread (also simply referred to herein as a "thread") can set or modify a value of the process identifier within the PID unit 105. Note that the use of the term "thread" herein and within the figures is merely for convenience, and not meant to be limiting upon the scope of the disclosure; embodiments of the present disclosure are applicable to any defined set of software code executed within the processor 101.

Once a thread (denoted as "Thread x" in FIG. 2) begins executing within the processor 101, the processor 101 will set the process identifier to a predetermined value (denoted as "Set PID to value y" in FIG. 2). For example, execution of a first thread may cause the process identifier within the PID unit 105 to have a first value, while a subsequent thread will then cause the process identifier within the PID unit 105 to become a second different value (or the same value in certain instances as further described herein).

As indicated by the exemplary illustration in FIG. 2, the setting of the process identifier value (e.g., value y) within the PID unit 105 may occur at a delayed time ("t") period from when the thread began executing within the processor 101. In accordance with embodiments of the present disclosure, it may be desired that the time ("t") between the start of the execution of a thread within the processor 101 and its modification of the process identifier value within the PID unit 105 be minimized. The foregoing is valid for other activities influencing or affecting the value of the process identifier within the PID unit 105 (e.g., the system hardware mechanisms 103 and the processor-internal mechanisms 104).

As previously disclosed, the process identifier value within the PID unit 105 may also be set or modified by system operations or hardware mechanisms 103 running within the data processing system 100, but not within the processor 101. Such system operations or hardware mechanisms 103 may occur independently, or even in parallel, to the execution of application software within the processor 101. Examples of such system operations or hardware mechanisms 103 include, but are not limited to, the start of a self-test within some section of hardware implemented within the data processing system 100, the entering of a specific state (e.g., an idle state) by a software or hardware unit (other than the processor 101) within the data processing system 100 or a peripheral device coupled to the data processing system 100, and exceptions or interruptions occurring within the data processing system 100.

Processor-internal mechanisms 104 may also be configured within the processor 101 to set or modify the process identifier value within the PID unit 105. Non-limiting examples of such processor-internal mechanisms 104 include, but are not limited to, the processor 101 entering a reset state, exiting a lock step-mode, or entering a decoupled parallel mode, internal performance monitor failures within the processor 101, a floating-point calculation error, or any internal failures or exceptions occurring within the processor 101 that are not caused directly via an influence external to the processor 101.

Figure 3:
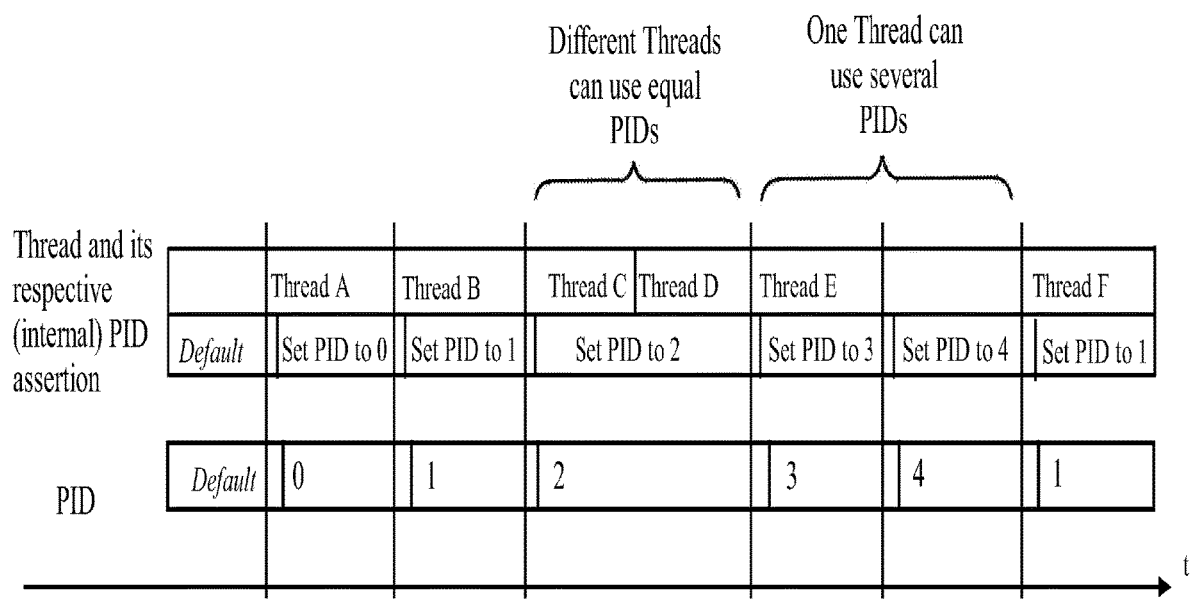
FIG. 3 illustrates a schematic diagram of examples of different software threads being executed in a processor and modifying a process identifier value accordingly.

FIG. 3 illustrates a schematic diagram of a non-limiting example of the execution in the processor 101 of different threads (denoted as Threads A through F in FIG. 3) over time ("t") and the resulting assertion (e.g., setting or modification) of the process identifier value within the PID unit 105. In this example, the start of the Thread A causes the process identifier within the PID unit 105 to be set to a value of "0"; the start of the Thread B causes the process identifier to transition to a value of "1"; the start of the Thread C causes the process identifier to transition to a value of "2"; the start of the Thread D causes the process identifier to remain at a value of "2"; the start of the Thread E causes the process identifier to transition to a value of "3," and then later during the execution of the Thread E by the processor 101, the process identifier is modified to a value of "4"; and, the start of the Thread F causes the process identifier to transition to a value of "1."

It can be noted within this example that a particular thread may result in assertions of the process identifier within the PID unit 105 to equal values (e.g., see the Threads C and D), and a particular thread may cause the process identifier value to transition to one or more different values (e.g., see the Thread E). As will be further described herein, embodiments of the present disclosure may be configured to recognize such process identifier value transitions as legitimate.

Referring again to FIG. 1, embodiments of the present disclosure implement a PID transition monitor 107 coupled to the PID unit 105 and configured to monitor the changing (transitioning) values of the process identifier within the PID unit 105. Embodiments of the present disclosure may implement the PID transition monitor 107 in hardware (e.g., an IP module) within the integrated circuitry implementing the processor 101, or as software running within the processor 101. In accordance with certain embodiments of the present disclosure, whether the PID transition monitor 107 is implemented in hardware or as software, it may be configured so that it is not readily accessible by an end user or after final installation (e.g., such as by a software application executed within the processor 101) for security reasons.

The PID transition monitor 107 is configured to monitor transitions of the process identifier within the PID unit 105 from one value to another, and then utilize such transitions to consult a predetermined assessment configuration set within the PID transition monitor 107 to determine whether each of the transitions is legitimate or illegitimate. Such an assessment configuration may be implemented in any suitable manner, such as within a stored database, state machine, or lookup table. For example, such an assessment configuration may be implemented as a permission matrix (e.g., see FIG. 4) that reflects possible process identifier transitions from one value to another, and defines in a predetermined manner (e.g., by the system designer, manufacturer, or an end user) whether each such process identifier transition is to be considered legitimate or illegitimate. In accordance with embodiments of the present disclosure, a legitimate transition of process identifier values (herein also referred to as a "legitimate process identifier transition") is considered to represent an expected or acceptable activity occurring within the processor 101, or the system 100 as a whole. In accordance with embodiments of the present disclosure, an illegitimate transition of process identifier values (herein also referred to as an "illegitimate process identifier transition") is considered to represent an unexpected, unacceptable, undesirable, unwanted, or erroneous activity occurring within the processor 101, or the system 100 as a whole, or the processor 101, or the system 100 as a whole, entering an unknown or unexpected state of operation. In accordance with certain embodiments of the present disclosure, an illegitimate process identifier transition may include an occurrence of any specific activity within the processor 101, or the system 100 as a whole, as predetermined by the system designer, manufacturer, or an end user. In accordance with embodiments of the present disclosure, an illegitimate process identifier transition may represent an occurrence of some sort of activity that does not fall within one of the predetermined legitimate process identifier transitions (e.g., as programmed within a permission matrix as described herein with respect to FIG. 4).

In accordance with embodiments of the present disclosure, examples of an illegitimate process identifier transition include, but are not limited to, the occurrence of an error or fault resulting from the execution of application software within the processor 101, unexpected activity occurring within some section of hardware within the data processing system 100 (e.g., see the system hardware mechanisms 103 in FIG. 1) that has affected the value of the process identifier within the PID unit 105, or an unexpected occurrence of some type of processor-internal mechanism 104 within the processor 101. Examples of unexpected activities occurring within the processor 101 (or the system 100) include, but are not limited to, an attack upon the system 100 by a third party hacker (e.g., a glitch attack, a physical attack upon the device in which the system 100 is packaged (e.g., a probing or laser attack), an overclocking attack, or an electromagnetic induction attack), the processor 101 transitioning from executing application software to entering a boot mode or a function such as a serial boot mode, a runaway of software code during execution of application software (e.g., resulting from damage to hardware within the processor 101 (or the system 100) by an alpha particle impact), and the occurrence of a certain predetermined activity monitored by the system 100. Examples of system hardware mechanisms 103 that may result in an illegitimate process identifier transition include, but are not limited to, starting of a system internal hardware self-test that runs within the system 100 but also affects the processor 101, a module within the system 100 but located externally from the processor 101 that causes an adverse effect upon the operation or functionality of the processor 101 (e.g., a system clock configuration module, which may cause the processor 101 to run according to a slow safe clock frequency instead of at a full system frequency rate), a processor 101 exception entry caused by a software instruction fetch error or a non-maskable interrupt, and a debugger connection to the system 100 that transitions the processor 101 into a debug condition or state. Examples of processor-internal mechanisms that may result in an illegitimate process identifier transition include, but are not limited to, processor 101 internal failures or exceptions that are not caused directly via an external influence (e.g., an internal performance monitor failure within the processor 101 or a floating-point calculation error).

In accordance with certain embodiments of the present disclosure, the PID transition monitor 107 may be accessible by the designer, manufacturer, or an end user of the system 100 via a software interface 108. It is well-known in the art for microcontroller and microprocessor cores to be configured, driven, or maintained through such software interfaces (and possibly accompanied with corresponding software executable within the processor 101). The software interface 108 may be implemented as memory-mapped registers or a dedicated memory module. Such a software interface 108 may be configured to enable the designer, manufacturer, or an user to configure the PID transition monitor 107, such as to program within the PID transition monitor 107 (e.g., within a permission matrix as described with respect to FIG. 4) which process identifier transitions are to be predetermined as legitimate and illegitimate, to configure predetermined actions, responses, or output signals resulting from identified legitimate or illegitimate process identifier transitions (e.g., within a matrix as described with respect to FIG. 8), to lock any such configurations from further modifications, and/or to monitor the status of the PID transition monitor 107.

Figure 5:
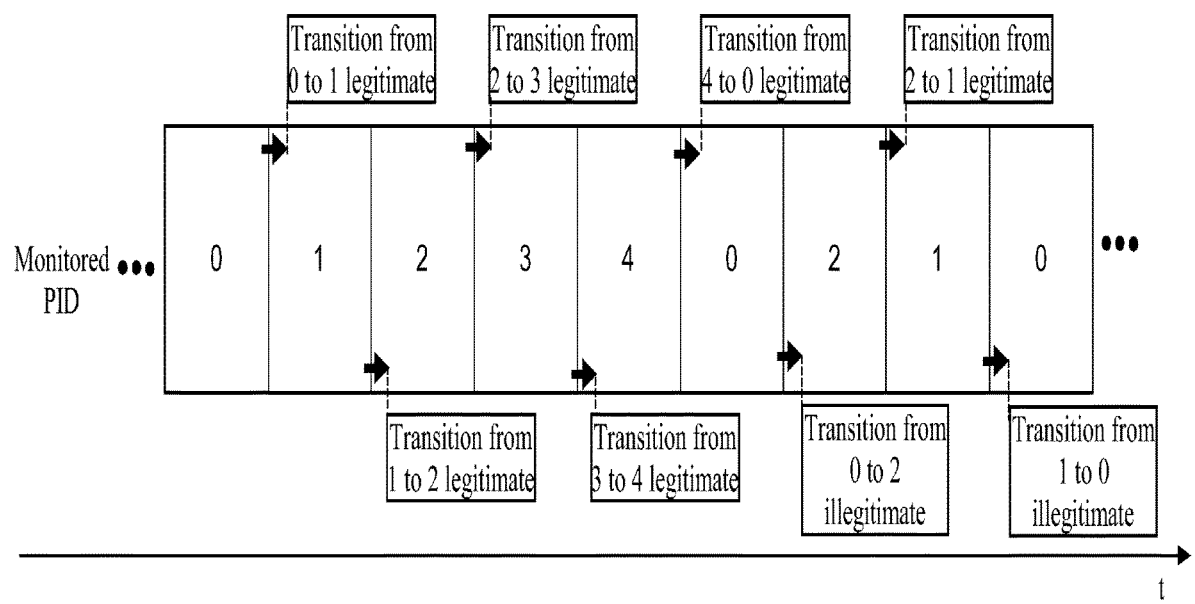
FIG. 5 illustrates a schematic diagram of an example of a modification of a process identifier value over time in a processor.

FIGS. 4-5 illustrate a non-limiting example of how the PID transition monitor 107 may be configured (predetermined) to assess (e.g., monitor for legitimate and illegitimate) process identifier transitions occurring within the PID unit 105. FIG. 4 illustrates a non-limiting example of a permission matrix that may be configured within the PID transition monitor 107, which stores and represents predetermined legitimate and illegitimate process identifier transitions. As previously disclosed, such a permission matrix may be implemented by any suitable configuration within the PID transition monitor 107, such as by utilization of a database, state machine, or lookup table. Within this exemplary permission matrix, a value of "1" in a cell represents a legitimate transition of process identifier values (i.e., the process identifier value within the PID unit 105 after the transition of its value from its previous value has been configured within the permission matrix to be a legitimate process identifier transition), while a "0" value in a cell within the permission matrix represents that such a transition in the process identifier value is considered to be an illegitimate process identifier transition. For example, the permission matrix of FIG. 4 has been configured, in part, to consider a transition of the process identifier from a value of "3" to a value of "1" to be a legitimate transition, while a transition of the process identifier from a value of "4" to a value of "3" is considered to be an illegitimate transition, and so on.

FIG. 5 illustrates exemplary runtime transitions of the process identifier values within the PID unit 105 as monitored by the PID transition monitor 107, and how the exemplary permission matrix of FIG. 4 can be utilized by the PID transition monitor 107 to determine which process identifier transitions are legitimate or illegitimate. For example, FIG. 5 demonstrates how the PID transition monitor 107 utilizes the permission matrix of FIG. 4 to determine that the process identifier transitions from values of "2" to "3" and from "4" to "0" are considered by the PID transition monitor 107 to be legitimate process identifier transitions. Correspondingly, FIG. 5 demonstrates how the PID transition monitor 107 utilizes the permission matrix of FIG. 4 to determine that the process identifier transitions from values of "0" to "2" and from "1" to "0" are considered by the PID transition monitor 107 to be illegitimate process identifier transitions.

Figure 6:
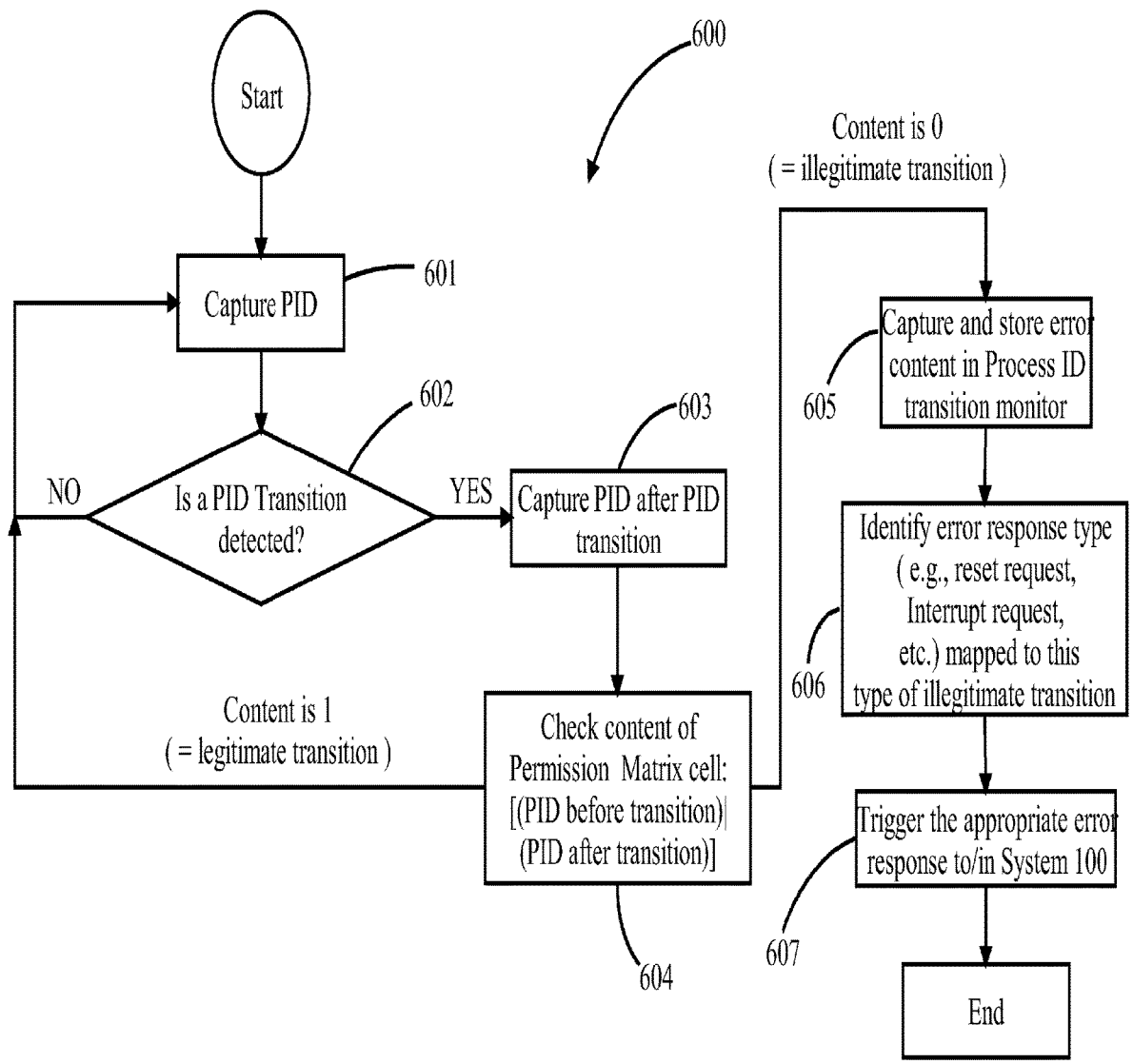
FIG. 6 illustrates a flowchart diagram of a system and process configured in accordance with embodiments of the present disclosure.

Referring next to FIG. 6, there is illustrated a flowchart diagram of a system and process 600 configured within the PID transition monitor 107 in accordance with embodiments of the present disclosure. The system and process 600 is configured to utilize predetermined selections made by the designer, manufacturer, or an end user of the system 100 for which process identifier transitions are to be considered legitimate or illegitimate, and resulting actions to be taken by the PID transition monitor 107 in response thereto. In the process block 601, the PID transition monitor 107 captures a monitored process identifier value from the PID unit 105. Monitoring and capturing of the process identifier values from the PID unit 105 may be performed in any suitable manner, and is within the capabilities of those of ordinary skill in the art. In the process block 602, the PID transition monitor 107 determines whether a transition of the process identifier value within the PID unit 105 has occurred (for example, during a following cycle of an execution by the processor 101 of a software application). If the process identifier value has not changed, then the system and process 600 returns to the process block 601 to repeat the process block 601.

Essentially, the process blocks 601-602 may be configured to loop until a transition of the process identifier values has been detected (e.g., see FIG. 5). Once a transition of process identifier values is detected within the process block 602, the system and process 600 proceeds to the process block 603 to capture the new value of the process identifier occurring after the transition. In the process block 604, the PID transition monitor 107 utilizes the process identifier value captured from the PID unit 105 before the transition (see the process block 601) and the process identifier value captured from the PID unit 105 after the transition (see the process block 603) to determine whether the transition of these process identifier values has been predetermined to be a legitimate or illegitimate process identifier transition. For example, referring to the exemplary permission matrix of FIG. 4, if the content of the cell representing the transition of these process identifier values has a value of "1," then the PID transition monitor 107 will determine that this transition of the process identifier values is legitimate, and the system and process 600 will return to the process block 601. However, if the PID transition monitor 107 determines that the transition of these process identifier values represents an illegitimate transition (e.g., the cell within the performance matrix has a value of "0"), then the system and process 600 will proceed to the process block 605 to record that an illegitimate transition of the process identifier values has occurred within the PID unit 105, which may also include what type of illegitimate transition has occurred. For example, the permission matrix may be configured to also store, for one or more of the illegitimate transitions, an identification of a reason or cause for the illegitimate transition (e.g., a PID transition from "3" to "0" may be identified within the permission matrix as representing an interrupt request, a glitch attack, etc.).

In the process block 606, the PID transition monitor 107 may then identify a type of response or reaction to trigger in response to the particular identified illegitimate process identifier transition. Referring to FIG. 8, there is illustrated a non-limiting example of a matrix (which may be implemented as any suitable database, lookup table, or state machine within the PID transition monitor 107) in which is recorded different types of reactions, responses, messages, or other signal types that may be triggered or initiated by the process block 607 as a function of one or more of the particular illegitimate process identifier transitions identified by the process block 606.

In this example, the reaction types of FIG. 8 match (on a cell-by-cell basis in each matrix) with the legitimate and illegitimate process identifier transitions of FIG. 4. As a consequence, the exemplary matrix in FIG. 8 has certain illegitimate process identifier transitions programmed with reactions or responses of a functional reset, other illegitimate process identifier transitions programmed with reactions or responses of a destructive reset, and still other illegitimate process identifier transitions programmed with a reaction or response to enter a safe mode or safe condition. In accordance with certain embodiments of the present disclosure, a functional reset may pertain to a reset reaction which only partially resets specific areas of the system 100 back into a known state, a destructive reset may pertain to a reset reaction that resets the entire system 100 back into a known state, and a safe mode or safe condition may pertain to a situation where the system 100 does not undergo a reset, but another less radical process may be performed within the system 100 such as a process to curtail or even repair the problem for which the illegitimate process identifier transition was initiated. In accordance with certain embodiments of the present disclosure, other types of reactions or responses may be programmed into the PID transition monitor 107 that are not shown in FIG. 8 (e.g., an exception or interrupt to another device within the system 100, other than the processor 101, which is configured to repair the system, or deactivating the data processing system 100). In accordance with certain embodiments of the present disclosure, the matrix of FIG. 8 may be configured to record that no reaction or response will be taken for legitimate process identifier transitions. Embodiments of the present disclosure are to not be limited to the foregoing reaction or response types; the system 100 may be configured to take any preprogrammed reaction or response desired by the designer, manufacturer, or an end user.

Referring again to FIG. 6, in the process block 607, the PID transition monitor 107 may trigger an output one of the aforementioned predetermined reactions or responses on the PID transition error 109 transmission line to be transmitted to the data processing system 100 (e.g., to a designated circuit, module, the processor 101 to be processed according to some sort of preselected algorithm, or for transmission to circuitry external to the system 100). In accordance with certain embodiments of the present disclosure, the PID transition monitor 107 may be configured to output a predetermined message, or other signal type, of the PID transition error 109 transmission line.

Figure 9:
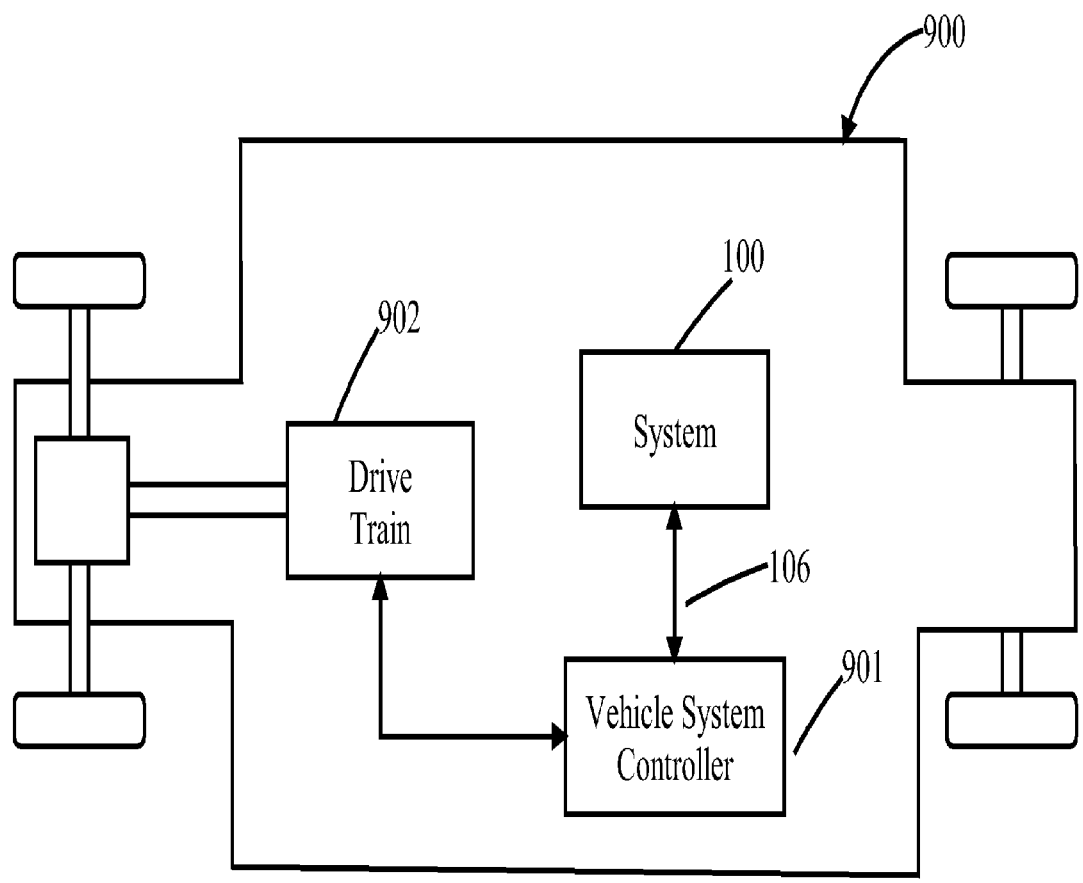
FIG. 9 illustrates a simplified block diagram of a vehicle configured in accordance with embodiments of the present disclosure.

FIG. 9 illustrates a simplified block diagram of a vehicle 900 configured in accordance with certain embodiments of the present disclosure, which exemplifies a potential application of utilization of embodiments of the present disclosure. Note that the embodiments described with respect to FIG. 9 are not meant to limit the potential applications of embodiments of the present disclosure.

The vehicle 900 is not limited to the configuration illustrated in FIG. 9. The vehicle 900 may be any type of motorized device, including a motor vehicle having a drive train 902 for causing movement of the vehicle 900. In accordance with certain embodiments of the present disclosure, the vehicle 900 may be an autonomous vehicle. The drive train 902 may be configured as an internal combustion engine, a hybrid drive train, or one that is all electric. Details of the drive train 902, and other aspects of the vehicle 900, are not provided herein for the sake of simplicity.

In accordance with certain embodiments of the present disclosure, one or more aspects of the drive train 902 may be monitored and/or controlled by a vehicle system controller 901. The system 100 (see FIG. 1) may be coupled to the vehicle system controller 901 via the system connection 106. In accordance with certain embodiments of the present disclosure, the PID transition error transmission line 109 may be coupled to the system connection 106 so that one of the aforementioned predetermined reactions, responses, messages, or other signal types may be transmitted to the vehicle system controller 901 via the system connection 106. Thus, in response to a determination by the PID transition monitor 107 that an illegitimate process identifier transition has occurred (e.g., see the process blocks 604-606 of FIG. 6), a predetermined response may be transmitted to the vehicle system controller 901 so that it can take appropriate action in response to the receipt thereof. A non-limiting example includes the vehicle system controller 901 presenting a warning (e.g., a check engine light) in a well-known manner to the driver or passenger of the vehicle 900 that there is a problem associated with a system implemented within the vehicle 900 (e.g., the system 100). For example, if the vehicle 900 is an autonomous vehicle, such a warning may inform the driver or passenger that they need to begin manually driving the vehicle 900 instead of the vehicle 900 being controlled by the autonomous system. Alternatively, in response to receipt of a predetermined response (e.g., see the process block 607 of FIG. 6) by the vehicle system controller 901 from the system 100, the vehicle system controller 901 may be configured to shut down the drive train 902 in a well-known manner.

Figure 7:
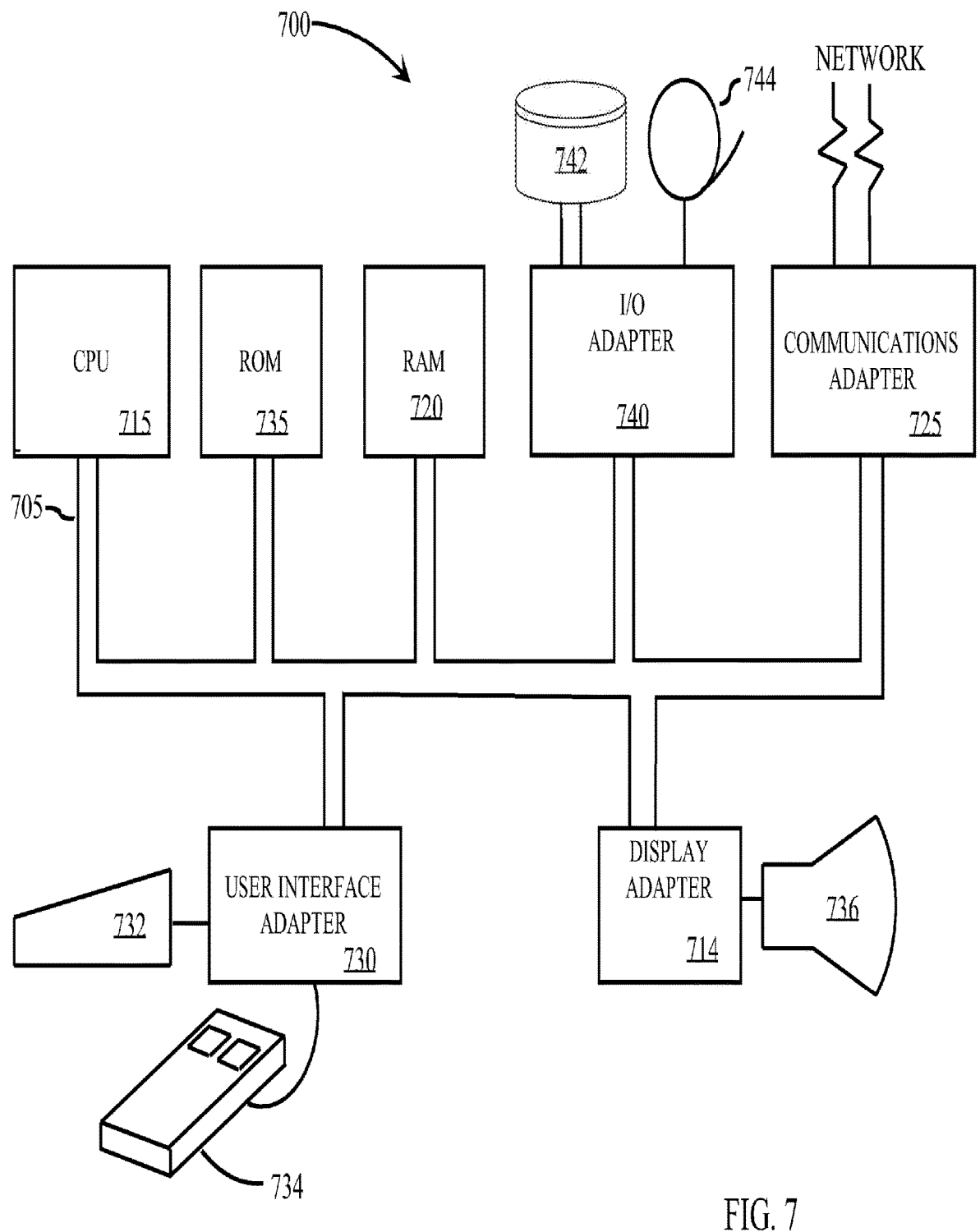
FIG. 7 illustrates a block diagram of a data processing system configured in accordance with embodiments of the present disclosure.

With reference now to FIG. 7, a block diagram of a data processing system 700 is depicted in which aspects of embodiments of the present disclosure may be implemented. The data processing system 700, in part, is disclosed herein to present non-limiting examples of how various software or hardware devices external to a microprocessor or microcontroller configured in accordance with embodiments described herein with respect to FIGS. 1-6 and 8-9 may cause process identifier transitions within the microprocessor or microcontroller (e.g., the processor 101), which are then detected by the PID transition monitor 107. Various embodiments of the system 700 may be configured with the relevant components described with respect to the system 100 of FIG. 1. Embodiments of the present disclosure are not to be limited to implementation within a system as particularly illustrated within FIG. 7. Furthermore, the vehicle system controller 901 may be implemented with various aspects of the system 700. (Note that the terms "data processing system," "computer," "system," and "computer system" may be interchangeably used herein.)

The data processing system 700 may employ a local bus 705 (e.g., a peripheral component interconnect ("PCI") local bus architecture). Other suitable bus architectures, such as Accelerated Graphics Port ("AGP") and Industry Standard Architecture ("ISA"), may be used, among others. A microprocessor or microcontroller ("CPU") 715 (e.g., the processor 101 of FIG. 1), a volatile memory ("RAM") 720, and/or a non-volatile memory 735 ("ROM") may be coupled to the local bus 705 (e.g., through a PCI Bridge (not shown)). Such a PCI Bridge also may include an integrated memory controller (not shown) and cache memory (not shown) for the processor 715. Additional connections to the local bus 705 may be made through direct component interconnections or through add-in boards. In the depicted example, a network communication adapter 725 (which may be configured to couple the system 700 to a local area network ("LAN") or wide area network ("WAN")), a small computer system interface ("SCSI") host bus adapter (not shown), and/or expansion bus interface (not shown) may be coupled to the local bus 705. An audio adapter (not shown), graphics adapter (not shown), and/or audio/display adapter 714 may be coupled to the local bus 705. The audio/display adapter 714 may be coupled to a display device 736, which may implement a touch screen display. The local bus 705 may include the system connection 106.

An interface (not shown) may be implemented to provide a connection for a user interface adapter 730, which may be coupled to various I/O devices, such as a keyboard 732 and/or mouse 734, a modem (not shown), and/or additional memory (not shown). A host bus I/O adapter 740 may be implemented to provide a connection for a hard disk drive 742, tape drive 744, and/or CD-ROM drive (not shown). The network communication adapter 725, I/O adapter 740, display adapter 714, user interface adapter 730, and any other interfaces implemented within the system 700 may be coupled to the system connection 106 of FIG. 1.

An operating system (which may include a kernel) may be run on the processor 715 and used to coordinate and provide control of various components within the data processing system 700 (e.g., operation of a process identifier (e.g., the PID unit 105)); the operating system may be a commercially available operating system. An object-oriented programming system, such as Java, may run in conjunction with the operating system and provide calls to the operating system from Java programs or programs executing on the data processing system 700. Instructions for the operating system, the object-oriented operating system, or application programs may be stored in the non-volatile memory 735, which may be configured as a solid state memory or a hard disk drive, and may be loaded into the volatile memory 720 for execution by the processor 715.

Those of ordinary skill in the art will appreciate that the hardware in FIG. 7 may vary depending on the implementation or application. Other internal hardware or peripheral devices, such as a flash ROM (or equivalent nonvolatile memory) or optical disk drives and the like, may be used in addition to or in place of the hardware depicted in FIG. 7. Also, embodiments of the present disclosure may be applied to a multiprocessor system in which a plurality of microprocessors and/or microcontrollers is implemented.

In accordance with certain aspects of the present disclosure, the data processing system 700 may be configured as a stand-alone system configured to be bootable without relying on some type of network communication, whether or not the data processing system 700 includes some type of network communication interface (e.g., the communication adapter 725). In accordance with certain aspects of the present disclosure, the data processing system 700 may be an embedded controller, which may be configured with a ROM (e.g., the ROM 735) or a flash ROM providing non-volatile memory storing operating system files, one or more application programs, and/or user-generated data.

The depicted example in FIG. 7 and above-described examples described with respect to FIGS. 1-6 and 8-9 are not meant to imply architectural limitations. Further, a computer program configured in accordance with embodiments of the present disclosure (e.g., implementing the system and process 600 of FIG. 6) may reside on any computer readable storage medium (e.g., a floppy disk, a compact disk, a hard disk (e.g., the hard drive 742), a tape drive (e.g., the tape drive 744), solid state memory (e.g., the ROM 735, the RAM 720, etc.) used by a computer system.

As will be appreciated by one skilled in the art, aspects of the present disclosure may be embodied as a system, process, method, or program product. Accordingly, aspects of the present disclosure may take the form of an entirely hardware embodiment, an entirely software embodiment (including firmware, resident software, micro-code, etc.), or embodiments combining software and hardware aspects that may all generally be referred to herein as a "device," "circuit," "circuitry," "module," or "system" configured to perform various operations and function disclosed herein. Furthermore, aspects of the present disclosure may take the form of a computer program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk (e.g., the hard drive 742), a random access memory (e.g., the RAM 720), a read-only memory (e.g., the ROM 735), an erasable programmable read-only memory ("EPROM" or Flash memory), an optical fiber, a portable compact disc read-only memory ("CD-ROM"), an optical storage device, a magnetic storage device, or any suitable combination of the foregoing. In accordance with aspects of the present disclosure, a computer readable storage medium may be any tangible medium that can contain or store a program or software instructions or code (e.g., threads) for use by or in connection with an instruction execution system, apparatus, processor (e.g., the processor 101 or the processor 715), controller (e.g., microcontroller), or device. Program (software) code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, processor (e.g., the processor 101 or the processor 715), controller (e.g., microcontroller), or device.

The flowchart diagram, block diagrams, and schematic diagrams in FIGS. 1-9 illustrate architectures, functionalities, and operations of possible implementations and applications of systems, processes, methods, and program products configured in accordance with various embodiments of the present disclosure. In this regard, each block in the flowchart or block diagrams, and depictions within the schematic diagrams, may represent circuitry, a circuit, a module, a segment, or a portion of code that includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in a reverse order, depending upon the functionality involved.

These program instructions may be provided to a microprocessor or microcontroller of a general purpose computer, special purpose computer or device, IP module, or other programmable data processing apparatus (e.g., microcontroller) to produce a machine, such that the instructions, which execute via the microprocessor or microcontroller of the computer, device, IP module, or other programmable data processing apparatus, create means for implementing the functions/acts specified in the flowchart or block diagram block or blocks, or functions represented or exemplified within the schematic diagrams.

It will also be noted that each block of the block diagrams or flowchart diagram illustration, and combinations of blocks in the block diagrams or flowchart diagram illustration, or functions represented or exemplified within the schematic diagrams, can be implemented by special purpose hardware-based systems that perform the specified functions or acts, or combinations of special purpose hardware and computer instructions. For example, a module (e.g., an IP module), such as the PID transition monitor 107, may be implemented as a hardware circuit comprising custom VLSI circuits or gate arrays, off-the-shelf semiconductors such as logic chips, transistors, controllers, or other discrete components. A module (e.g., an IP module), such as the PID transition monitor 107, may also be implemented in programmable hardware devices such as field programmable gate arrays, programmable array logic, programmable logic devices, or the like.

Computer program code, i.e., instructions, for carrying out operations for aspects of the present disclosure (such as the system and process 600 or functionalities described herein with respect to FIGS. 1-6 and 8-9) may be written in any combination of one or more programming languages, including, but not limited to, an object-oriented programming language such as Java, Smalltalk, C++, or the like, and conventional procedural programming languages, such as the "C" programming language or similar programming languages.

These program instructions may also be stored in a computer readable storage medium that can direct a data processing system (e.g., the system 100, the system 700, or the vehicle system controller 901), other programmable data processing apparatus, microcontroller, IP module, or other devices to function in a particular manner, such that the instructions stored in the computer readable medium produce an article of manufacture including instructions that implement the functions/acts specified in the flowchart or block diagram block or blocks, or functions represented or exemplified within the schematic diagrams.

The program instructions may also be loaded onto a data processing system (e.g., the system 100, the system 700, or the vehicle system controller 901), other programmable data processing apparatus, microcontroller, IP module, or other devices (e.g., via the software interface 108) to cause a series of operational steps to be performed, so as to produce a computer-implemented process such that the instructions that execute on the data processing system, other programmable data processing apparatus, microcontroller, IP module, or other devices provide processes for implementing the functions/acts specified in the flowchart or block diagram block or blocks, or functions represented or exemplified within the schematic diagrams.

One or more types of databases may be included in the system 100 (or the system 700, or the vehicle system controller 901) suitable for storing and providing access to data for the various implementations (e.g., for implementing a performance matrix such as described with respect to FIG. 4 or the matrix described with respect to FIG. 8). One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, or the like. The database (e.g., parameters for determining legitimate and illegitimate PID transitions, or signals for actions taken by the PID transition monitor 107 (e.g., see the process blocks 606 and 607 in FIG. 6)) may be organized in any suitable manner, including as data tables, lookup tables, or state machines.

Association of certain data may be accomplished through any data association technique known and practiced in the art (e.g., a lookup table or state machine). For example, the association may be accomplished either manually or automatically. Automatic association techniques may include, for example, a database search, a database merge, GREP, AGREP, SQL, or the like.

Aspects of the present disclosure provide a data processing system including a processor, a process identifier unit configured to track process identifier values associated with activities occurring within the processor, and a process identifier transition monitor configured to determine when a transition of the tracked process identifier values from a first value to a second value is illegitimate. The process identifier transition monitor may be configured to output a signal as a function of a determination that the transition of the tracked process identifier values is illegitimate. The process identifier transition monitor may include a lookup table configured to contain entries that indicate which process identifier transitions are legitimate and which are illegitimate. In accordance with certain aspects of the present disclosure, the illegitimate transition of the tracked process identifier values represents an error in an execution of application software in the processor. In accordance with certain aspects of the present disclosure, the illegitimate transition of the tracked process identifier values represents an occurrence of a cyberattack received within the data processing system. In accordance with certain aspects of the present disclosure, the illegitimate transition of the tracked process identifier values represents an unexpected execution in the processor of a certain first thread after execution of a certain second thread. In accordance with certain aspects of the present disclosure, the illegitimate transition of the tracked process identifier values represents an occurrence of a certain activity within the data processing system. In accordance with certain aspects of the present disclosure, the process identifier transition monitor may be configured to capture the first and second values of the tracked process identifier and perform a lookup of the transition in the lookup table to determine whether the transition has been predetermined to be legitimate or illegitimate. In accordance with certain aspects of the present disclosure, the process identifier transition monitor may be configured to select a predetermined response associated with the illegitimate transition, wherein the signal is delivered to a portion of the data processing system as a function of the selected predetermined response. In accordance with certain aspects of the present disclosure, the signal may be configured to cause a vehicle to shut down its drive train. In accordance with certain aspects of the present disclosure, the signal may be configured to cause a warning to be transmitted to a driver or passenger of a vehicle. In accordance with certain aspects of the present disclosure, a legitimate transition of process identifier values represents an expected or acceptable activity occurring within the processor, and an illegitimate transition of process identifier values represents an unexpected, unacceptable, undesirable, unwanted, or erroneous activity occurring within the processor.

Aspects of the present disclosure provide a method that includes monitoring a transition of process identifier values, and determining when the transition of process identifier values represents an illegitimate transition of the process identifier values. The method may further include triggering a predetermined response as a function of the determining of the illegitimate transition of the process identifier values. The monitoring of the transition of process identifier values may further include capturing a first process identifier value from a process identifier unit associated with a processor, and capturing a second process identifier value from the process identifier unit, wherein the determining when the transition of process identifier values represents the illegitimate transition of the process identifier values may further include using the first and second process identifier values to perform a lookup in a permission matrix, resulting in the determination that the transition represents the illegitimate transition. In accordance with certain aspects of the present disclosure, the method may further include triggering a predetermined response as a function of the determining of the illegitimate transition of the process identifier values. In accordance with certain aspects of the present disclosure, the predetermined response is a reset of the processor to a predetermined known state. In accordance with certain aspects of the present disclosure, the predetermined response is a signal sent to a vehicle system controller that is configured to perform a specified function in response to the signal. In accordance with certain aspects of the present disclosure, the illegitimate transition represents an occurrence of a certain activity within a data processing system containing the processor. In accordance with certain aspects of the present disclosure, the certain activity is selected from the group consisting of an execution of unexpected software code by the processor, an occurrence of a cyberattack received within the data processing system, a failure of a hardware mechanism external to the processor in the data processing system, and a failure or error occurring in the processor.

Aspects of the present disclosure provide a data processing system that includes a processor, a process identifier unit configured to track process identifier values associated with activities occurring within the processor, and a process identifier transition monitor configured to determine whether a transition of the tracked process identifier values from a first value to a second value is legitimate or illegitimate, wherein the process identifier transition monitor further includes circuitry for capturing the first process identifier value from the process identifier unit, circuitry for capturing the second process identifier value from the process identifier unit, circuitry for performing a lookup in a permission matrix configured to contain entries that indicate which transitions of tracked process identifier values are legitimate and which transitions of tracked process identifier values are illegitimate, circuitry for determining from the entries in the permission matrix that the transition of the tracked process identifier values from the first value to the second value represents an illegitimate transition of process identifier values, and circuitry for triggering a predetermined response to the determination that the transition of the tracked process identifier values from the first value to the second value represents an illegitimate transition of process identifier values. In accordance with certain aspects of the present disclosure, the illegitimate transition of the tracked process identifier values may represent the processor entering an unknown or unexpected state of operation. In accordance with certain aspects of the present disclosure, the predetermined response may include resetting the processor to a known state of operation, rebooting the processor, or deactivating the data processing system.

Reference may be made herein to a device, circuit, circuitry, system, or module "configured to" perform a particular function or functions. It should be understood that this may include selecting predefined logic blocks and logically associating them, such that they provide particular logic functions, which includes monitoring or control functions. It may also include programming computer software-based logic, wiring discrete hardware components, or a combination of any or all of the foregoing.

Reference throughout this specification to "an embodiment," "embodiments," "certain embodiments," "various embodiments," or similar language means that a particular feature, structure, or characteristic described in connection with the embodiments is included in at least one embodiment of the present disclosure. Thus, appearances of the phrases "in embodiments," "in an embodiment," "embodiments," "in certain embodiments," and similar language throughout this specification may, but do not necessarily, all refer to the same embodiment. Furthermore, the described features, structures, aspects, or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

The terminology used herein is for the purpose of describing particular embodiments and applications only and is not intended to be limiting of the disclosure. In the descriptions herein, numerous specific details are provided, such as examples of activities, circumstances, services, faults, errors, responses, reactions, processor activities, operations, events, mechanisms, software threads, cyberattacks, signals, or actions (e.g., taken by the PID transition monitor 107), programming, software modules, designer, manufacturer, or end user selections (e.g., of legitimate and illegitimate PID transitions), network transactions, database queries, database structures (e.g., see FIGS. 4 and 8), hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, activities, circumstances, services, faults, errors, responses, reactions, processor activities, operations, events, mechanisms, software threads, cyberattacks, signals, and so forth. In other instances, well-known structures, materials, or operations may be not shown or described in detail to avoid obscuring aspects of the disclosure.

Benefits, advantages, and solutions to problems may have been described herein with regard to specific embodiments or applications (e.g., see FIG. 9). However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present disclosure. It should be appreciated that the particular implementations and applications (e.g., see FIG. 9) shown and described herein may be illustrative of the disclosure and are not intended to otherwise limit the scope of the present disclosure in any way. Other variations may be within the scope of the following claims. Headings herein are not intended to limit the disclosure, embodiments of the disclosure, or other matter disclosed under the headings.

Herein, the term "or" may be intended to be inclusive, wherein "A or B" includes A or B and also includes both A and B. As used herein, the term "or" when used in the context of a listing of entities, refers to the entities being present singly or in combination. Thus, for example, the phrase "A, B, C, or D" includes A, B, C, and D individually, but also includes any and all combinations and subcombinations of A, B, C, and D. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the singular forms "a," "an," and "the" may be intended to include the plural forms as well, unless the context clearly indicates otherwise.

The corresponding structures, materials, acts, and equivalents of all means or step plus function elements in the claims may be intended to include any structure, material, or act for performing the function in combination with other claimed elements as specifically claimed.

What is claimed is:

1. A vehicle system, comprising:
 a first memory configured to store a process identifier;
 a vehicle system controller configured to control an operation of a vehicle;
 a hardware peripheral device in electrical communication with the first memory, the hardware peripheral device including a processor configured to execute:
  a first process associated with a first function of the hardware peripheral device, wherein the first process is associated with an idle state of the hardware peripheral device and the first process is associated with a first process identifier, and a second process associated with a second function of the hardware peripheral device, wherein the second process is associated with a reset state of the hardware peripheral device and the second process is associated with a second process identifier, and wherein the processor is configured to store the first process identifier into the first memory when the processor is executing the first process and store the second process identifier into the first memory when the processor is executing the second process;

a second memory configured to store a process transition permission matrix including a plurality of process identifier transitions, wherein each process identifier transition in the plurality of process identifier transitions includes a pair of process identifiers, and an indication for each process identifier transition in the plurality of process identifier transitions, of whether the process identifier transition is authorized; and a process transition monitor in electrical communication with the first memory and the second memory, the process transition monitor being configured to:
periodically monitor the process identifier stored in the first memory, and upon determining the process identifier stored in the first memory has transitioned from the first process identifier to the second process identifier:
access the process transition permission matrix to identify a first process identifier transition that includes the first process identifier and the second process identifier,
determine, based on the indication of whether the first process identifier transition is authorized, that the first process identifier transition is not authorized, and
upon determining that the first process identifier transition is not authorized, cause the vehicle system controller to shut down a drive train of the vehicle.

2. The vehicle system of claim 1, wherein the process transition monitor is configured to, upon determining that the first process identifier transition is not authorized, cause the vehicle system controller to generate an output using a user interface of the vehicle, wherein the output indicates an error has occurred in the vehicle.

3. The vehicle system of claim 2, wherein the output includes a check-engine light.

4. The vehicle system of claim 1, wherein the process transition monitor is configured to, upon determining that the first process identifier transition is not authorized, initiate a reset of the hardware peripheral device.

5. A system, comprising:
a first memory configured to store a process identifier;
a hardware peripheral device in electrical communication with the first memory, the hardware peripheral device including a processor configured to execute:
a first process associated with a first function of the hardware peripheral device, wherein the first process is associated with a first process identifier, and
a second process associated with a second function of the hardware peripheral device, wherein the second process is associated with a second process identifier, and wherein the processor is configured to store the first process identifier into the first memory when the processor is executing the first process and store the second process identifier into the first memory when the processor is executing the second process;

a second memory configured to store a process transition permission matrix including a plurality of process identifier transitions and identifies for each process identifier transition an indication of whether the process identifier transition is authorized; and a process transition monitor in electrical communication with the first memory and the second memory, the process transition monitor being configured to:
determine the process identifier stored in the first memory has transitioned from the first process identifier to the second process identifier in a first process identifier transition,
access the process transition permission matrix to determine that the transition from the first process identifier to the second process identifier is not authorized, and
execute a response as a function of the transition from the first process identifier to the second process identifier not being authorized.

6. The system of claim 5, further comprising a third memory configured to store a response matrix that includes the plurality of process identifier transitions and identifies for each process identifier transition a predetermined response.

7. The system of claim 6, wherein the process transition monitor is configured to determine the response by identifying in the response matrix a first predetermined response associated with the first process identifier transition.

8. The system of claim 7, wherein the first predetermined response includes a functional reset configured to reset the hardware peripheral device or a destructive reset configured to reset the system.

9. The system of claim 7, wherein the first predetermined response includes transmitting a signal to a vehicle system controller to cause the vehicle system controller to execute a specified function in response to the signal.

10. The system of claim 9, wherein the specified function includes shutting down a drive train of a vehicle.

11. A system, comprising:
a first memory configured to store a process identifier;
a second memory configured to store a response matrix that includes a plurality of process identifier transitions and identifies a predetermined response for each process identifier transition of the plurality of process identifier transitions;
a processor configured to execute:
a first process associated with a first process identifier, and
a second process associated with a second process identifier, and wherein the processor is configured to store the first process identifier into the first memory following execution of the first process and store the second process identifier into the first memory following execution of the second process; and
a process transition monitor in electrical communication with the first memory, the process transition monitor being configured to:
retrieve, at a first time, the first process identifier from the first memory,
receive, at a second time after the first time, the second process identifier from the first memory,
determine a transition from the first process identifier to the second process identifier is an unauthorized process identifier transition, and execute a response as a function of the transition from the first process identifier to the second process identifier being the unauthorized process identifier transition.

12. The system of claim 11, wherein the process transition monitor is configured to determine the response by identifying in the response matrix a first predetermined response associated with the transition from the first process identifier to the second process identifier.

13. The system of claim 12, wherein the first predetermined response includes a functional reset configured to reset the processor or a destructive reset configured to reset the system.

14. The system of claim 12, wherein the first predetermined response includes transmitting a signal to a vehicle system controller to cause the vehicle system controller to execute a specified function in response to the signal.

15. The system of claim 14, wherein the specified function includes shutting down a drive train of a vehicle.

* * * * *